US012122207B2

(12) United States Patent
Sabelhaus

(10) Patent No.: US 12,122,207 B2
(45) Date of Patent: Oct. 22, 2024

(54) METHOD FOR COUPLING A TRAILER TO A TOWING VEHICLE, COUPLING CONTROL DEVICE AND VEHICLE

(71) Applicant: ZF CV Systems Global GmbH, Bern (CH)

(72) Inventor: Dennis Sabelhaus, Luhden (DE)

(73) Assignee: ZF CV Systems Global GmbH, Bern (CH)

( * ) Notice: Subject to any disclaimer, the term of this patent is extended or adjusted under 35 U.S.C. 154(b) by 110 days.

(21) Appl. No.: 18/159,522

(22) Filed: Jan. 25, 2023

(65) Prior Publication Data

US 2023/0158851 A1 May 25, 2023

Related U.S. Application Data

(63) Continuation of application No. PCT/EP2021/070079, filed on Jul. 19, 2021.

(30) Foreign Application Priority Data

Aug. 17, 2020 (DE) ...................... 10 2020 121 497.9

(51) Int. Cl.
*B60G 17/016* (2006.01)
*B62D 53/08* (2006.01)
*B62D 53/12* (2006.01)

(52) U.S. Cl.
CPC ....... *B60G 17/016* (2013.01); *B62D 53/0842* (2013.01); *B62D 53/12* (2013.01); *B60G 2300/044* (2013.01); *B60G 2500/30* (2013.01)

(58) Field of Classification Search
CPC ............ B60G 17/016; B60G 2300/044; B60G 2500/30; B62D 53/0842; B62D 53/12
See application file for complete search history.

(56) References Cited

U.S. PATENT DOCUMENTS

| 1,805,642 A | * | 5/1931 | Strachan | ............ B62D 53/0842 |
| | | | | 280/422 |
| 4,383,697 A | * | 5/1983 | F'Geppert | .......... B62D 53/0828 |
| | | | | 280/433 |

(Continued)

FOREIGN PATENT DOCUMENTS

| DE | 10 2006 057 610 A1 | 4/2008 |
| DE | 10 2014 110 498 A1 | 1/2016 |

(Continued)

OTHER PUBLICATIONS

International Search Report of the European Patent Office dated Sep. 24, 2021 for international application PCT/EP2021/070079 on which this application is based.

(Continued)

*Primary Examiner* — Faye M Fleming
(74) *Attorney, Agent, or Firm* — Walter Ottesen, P.A.

(57) ABSTRACT

A method for coupling a semi-trailer with a top plate to a truck tractor with a coupling plate includes: importing a reference height profile assigning a reference gradient to different actual values for the relative height of the chassis to the rear axle of the truck-tractor; changing the relative height such that the coupling plate approaches the top plate; continuously determining actual height values and height gradients while changing the relative height, wherein an actual height value is assigned the currently determined actual height gradient; checking a coupling criterion by comparing a currently determined actual height gradient with the reference gradient, wherein the reference gradient which in the imported reference height profile is assigned to the same actual height value as the currently determined actual height gradient is applied; and, maintaining the relative height when the currently determined actual height gradient deviates from the reference gradient.

20 Claims, 4 Drawing Sheets

(56) References Cited

U.S. PATENT DOCUMENTS

| | | | |
|---|---|---|---|
| 11,420,691 B2* | 8/2022 | Köster | .................... B60D 1/64 |
| 2006/0293800 A1 | 12/2006 | Bauer et al. | |
| 2019/0241215 A1 | 8/2019 | Schaeper et al. | |
| 2019/0258874 A1 | 8/2019 | Zhang et al. | |
| 2024/0132169 A1* | 4/2024 | Saupe | ................. B60G 17/017 |

FOREIGN PATENT DOCUMENTS

| | | |
|---|---|---|
| DE | 10 2016 011 323 A1 | 3/2018 |
| DE | 10 2019 104 352 A1 | 8/2019 |
| EP | 1 740 400 B1 | 1/2007 |
| EP | 1 874 616 B1 | 1/2008 |
| EP | 2 401 165 B1 | 1/2012 |
| WO | 2007/102777 A1 | 9/2007 |

OTHER PUBLICATIONS

English translation and Written Opinion of the International Searching Authority dated Sep. 24, 2021 for International application PCT/EP2021/070079 on which this application is based.

* cited by examiner

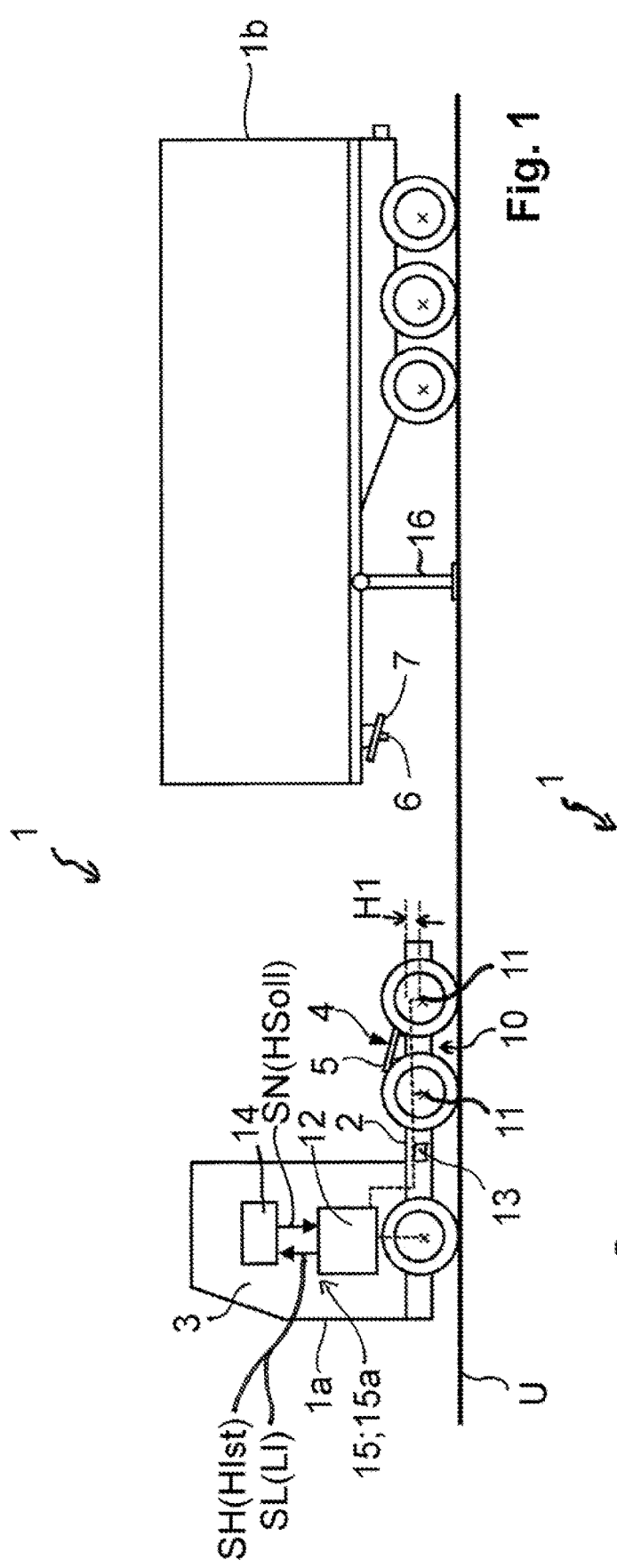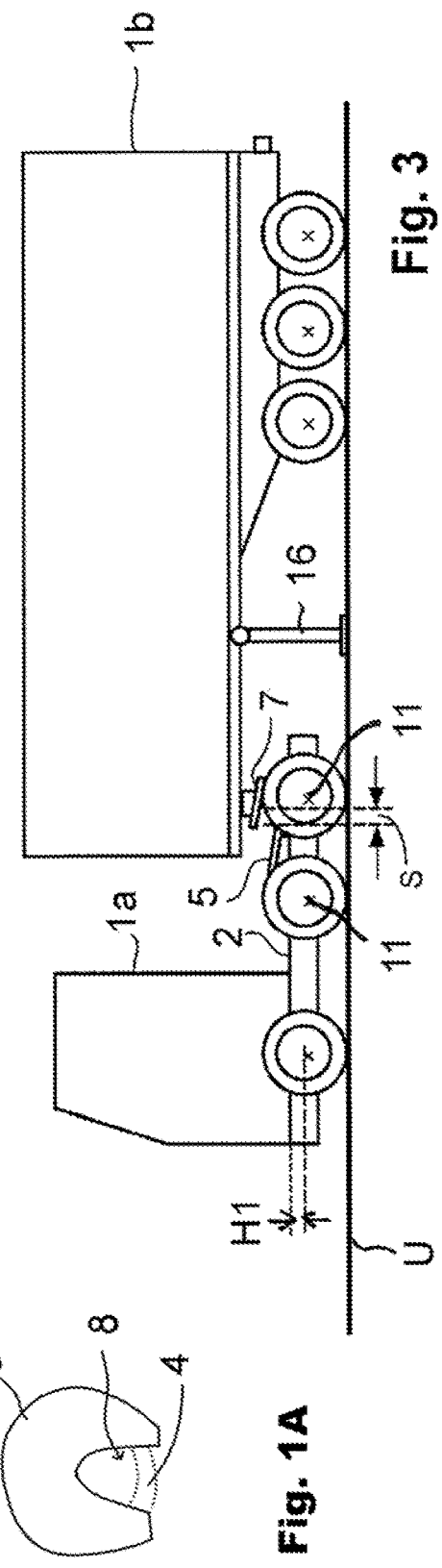
Fig. 1
Fig. 1A
Fig. 3

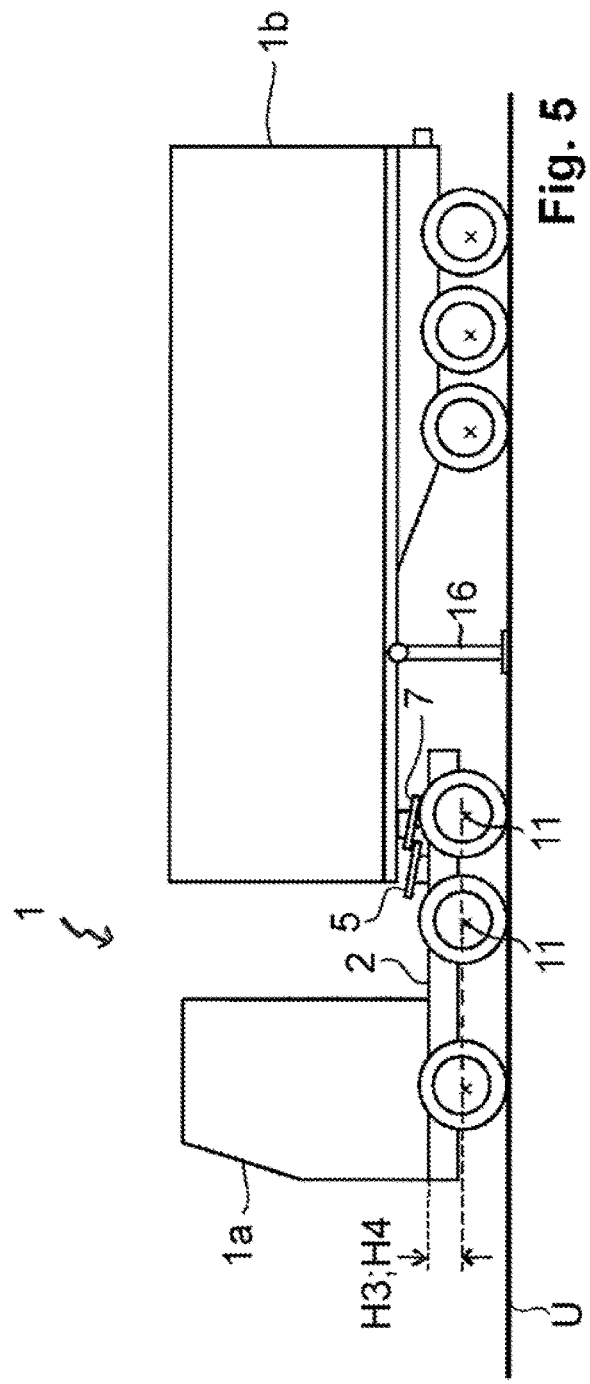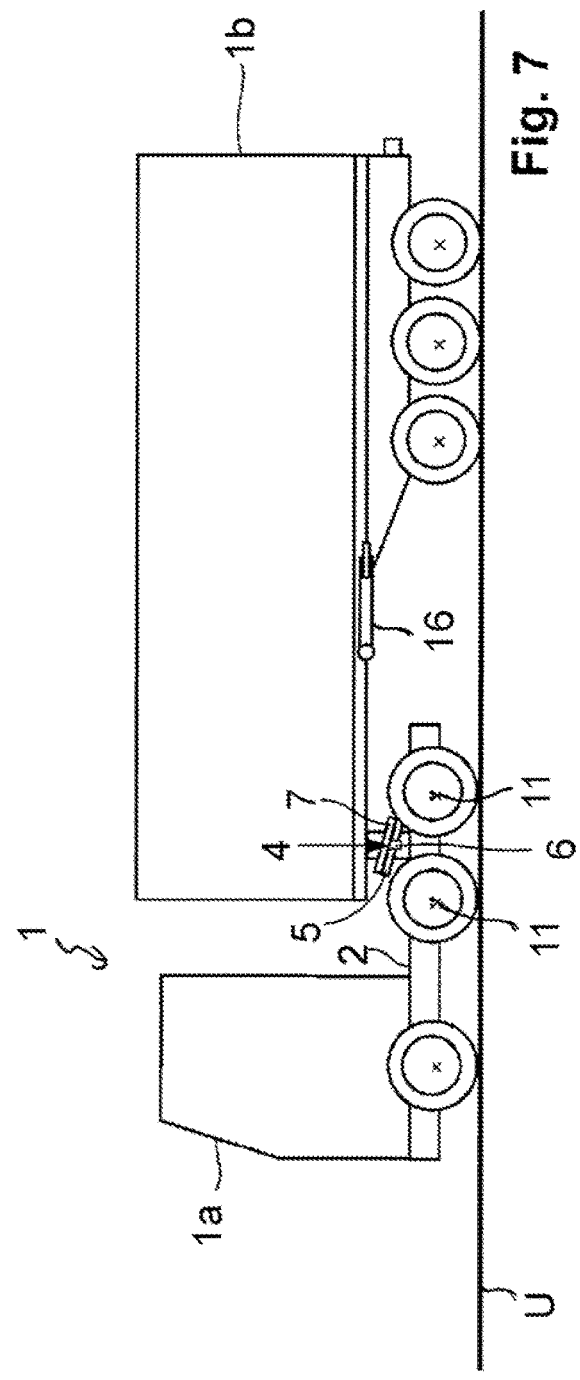

METHOD FOR COUPLING A TRAILER TO A TOWING VEHICLE, COUPLING CONTROL DEVICE AND VEHICLE

CROSS-REFERENCE TO RELATED APPLICATIONS

This application is a continuation application of international patent application PCT/EP2021/070079, filed Jul. 19, 2021, designating the United States and claiming priority from German application 10 2020 121 497.9, filed Aug. 17, 2020, and the entire content of both applications is incorporated herein by reference.

TECHNICAL FIELD

The disclosure relates to a method for coupling a semi-trailer to a truck tractor, a coupling control device for carrying out the method, and to a vehicle made up of a truck tractor and a trailer.

BACKGROUND

Methods are known from the prior art in which a truck tractor drives up to a setpoint object, for example a semi-trailer, in order to dock with it. This is usually done with great effort, in that the driver manually adjusts the height of a coupling plate on the truck tractor, in which a kingpin of the semi-trailer can be accommodated and fixed, and then moves the truck tractor so as to approach the semi-trailer. The coupling plate is then manually monitored and brought closer to the kingpin in order to fix it in the coupling plate.

Methods from DE 10 2006 057 610 A1, DE 10 2014 110 498 A1, US 2019/0258874, WO2007102777A1, US 2006/0293800 and EP 1 874 616 B1 are already known to facilitate this coupling procedure. In order to enable an ideally fast and smooth coupling procedure, in which damage to the kingpin and/or the coupling plate is avoided, US 2019/0241215 also provides that the contact between the coupling plate of the truck tractor and the top plate of the semi-trailer, which is above the kingpin, is determined by a change in the actuating speed or an actual height gradient, the actual height gradient indicating the change in height between the at least one rear axle of the truck tractor and a vehicle body to which the coupling plate is attached. If there is a change, it can be concluded that the coupling plate is being loaded by the top plate, since the actuating speed has decreased. The disadvantage here is that a change in the actuating speed or the actual height gradient does not necessarily result from contact between the top plate and the coupling plate.

SUMMARY

It is an object of the disclosure to specify a method for coupling a semi-trailer to a truck tractor that can be carried out quickly and easily and enables a reliable coupling procedure.

This object is achieved by various methods according to the disclosure

It is a further object to provide a docking control device and a vehicle.

This object is achieved by various coupling control devices and vehicles according to the disclosure.

According to the disclosure, a method for coupling a semi-trailer to a truck tractor is therefore provided, the truck tractor having a chassis and a coupling plate arranged thereon, and the semi-trailer having a top plate with a kingpin, wherein the kingpin can be pivotably fixed to the coupling plate in the coupled state by a locking device. The truck tractor furthermore has a ride-height control system, wherein the height of the chassis relative to at least one rear axle of the truck tractor can be changed by manually or automatically actuating the ride-height control system. The method here includes at least the following steps:

importing a reference height profile, wherein the reference height profile assigns a reference height gradient to different actual height values for the height of the chassis relative to the at least one rear axle;

changing the height of the chassis relative to the at least one rear axle in such a manner that the coupling plate of the truck tractor approaches the top plate of the semi-trailer;

continuously determining actual height values and actual height gradients while changing the height of the chassis relative to the at least one rear axle, wherein an actual height value is assigned the currently determined actual height gradient;

checking a coupling criterion by comparing a currently determined actual height gradient with a reference height gradient, wherein the reference height gradient is utilized which in the imported reference height profile is assigned to the same actual height value as the currently determined actual height gradient;

maintaining the height of the chassis relative to the at least one rear axle when the coupling criterion is met, wherein the coupling criterion is met when the currently determined actual height gradient deviates from the reference height gradient.

Preferably, the truck tractor can then be moved so as to approach to the semi-trailer in such a manner that the kingpin is received in a receiving slot of the coupling plate. As a result, the kingpin can be fixed by a locking device in order for the coupling procedure to be completed.

Advantageously, methods according to the disclosure can thus ensure that contact between the coupling plate and the top plate is only inferred once the actual height gradient deviates from the reference height gradient. Therefore, the indicator for this event is no longer a change in the actual height gradient per se, as indicated in the prior art, but the deviation from the reference. This is particularly advantageous when the chassis, when the coupling plate approaches the top plate, owing to system-internal adjustment of the ride-height control system is displaced upward at a changed actuating speed and thus a changed actual height gradient, without any changed load acting on the coupling plate. This makes checking the coupling criterion more reliable and the coupling procedure can be carried out more reliably and without misinterpretations.

Preferably, it can also be provided to this end that the reference height profile is determined in advance without the coupling plate of the truck tractor being loaded, wherein to this end the height of the chassis relative to the at least one rear axle is changed once or several times between a first height value, for example a minimum height, and a second height value, for example a maximum height, and during the changing of the height of the chassis relative to the at least one rear axle, actual height values and actual height gradients are continuously determined, wherein the currently determined actual height gradient is assigned to an actual height value as a reference height gradient and is stored in the reference height profile.

This enables the reference height profile to be determined easily, which can be done in particular immediately before the coupling procedure, so that a current reference can be utilized that reflects the current system-internal behavior of the ride-height control system.

It can furthermore preferably be provided that the actual height gradient and/or the reference height gradient takes place by a temporally offset determination of actual height values, wherein the temporal offset is between 100 ms and 300 ms. This enables the respective gradient to be determined easily, with the temporal offset being selected in such a way that contact between the top plate and the coupling plate can be responded to in good time.

It can furthermore preferably be provided that the height is adjusted by way of the ride-height control system by specifying a desired height value. Therefore, in the method, for example via a coupling control device according to the disclosure, a change in the height can be instructed in a simple manner in the respective step of the method. This can preferably take place by way of a data bus in the vehicle, in particular the CAN bus, which reduces the effort, since the ride-height control system is connected to such a data bus anyway.

It can furthermore preferably be provided that changing the height of the chassis relative to the at least one rear axle in order to bring the coupling plate of the truck tractor closer to the top plate of the semi-trailer takes place after the top plate of the semi-trailer has been brought at least partially to overlap with the coupling plate of the truck tractor, preferably by a manual or automated approach of the truck tractor to the semi-trailer. This ensures that when the height changes, the top plate can act on the coupling plate in order to be able to determine a deviation of the actual height gradient from the reference height gradient.

It can preferably be provided here that the height of the chassis relative to the at least one rear axle of the truck tractor is adjusted before the coupling plate and the top plate are brought to overlap in such a manner that the coupling plate and the top plate do not touch when they are brought to overlap. This ensures that the two plates only touch when they are brought closer to each other in a targeted manner by way of the ride-height control system. This can prevent damage to the plates and the kingpin.

In addition, to this end it can be provided that the coupling plate and the top plate are brought to overlap in such a manner that the kingpin does not cover the coupling plate, wherein a safety distance between the coupling plate and the kingpin is maintained. This can prevent the kingpin from pressing against the coupling plate when the chassis is raised if the top plate is not exactly aligned with the coupling plate. As a result, it can moreover be prevented that a deviation from the reference height gradient is determined when the kingpin unintentionally impacts the coupling plate. It is only when the truck tractor subsequently approaches the semi-trailer that the kingpin enters the receiving slot of the coupling plate, whereby their mutual alignment can be checked beforehand.

It is preferably furthermore provided that the coupling criterion is met if the currently determined actual height gradient falls below a gradient threshold value, the gradient threshold value (dHS) being determined from the reference height gradient (dHR), as a function of a tolerance factor (T), preferably from $dHS = T \times dHR$. This ensures that contact between the coupling plate and the top plate is not already inferred from any deviations, since these can also be caused by measurement technology. It is preferably provided that the tolerance factor is between 0.7 and 0.85, preferably is 0.8. If there is a deviation of between at least 15% and at least 30%, preferably at least 20%, it can be assumed with a high level of certainty that contact has occurred.

It is preferably also provided that, in order to meet the coupling criterion, it is additionally checked whether an actual axle load value, which indicates an axle load on the at least one rear axle in the presence of a deviation between the currently determined actual height gradient and the reference height gradient, deviates upward from a reference axle load which is determined prior to changing the height of the chassis relative to the at least one rear axle. Advantageously, by evaluating the axle load, it can thus be concluded whether the semi-trailer is additionally acting on the chassis or the rear axle, respectively. This allows a plausibility check to be carried out. In particular, it can be provided here that the coupling criterion is met if an axle load difference between the reference axle load and the actual axle load value in the presence of a deviation between the currently determined actual height gradient and the reference height gradient indicates that the axle load on the at least one rear axle has changed by more than 1 t. This is a reliable criterion as to whether the semi-trailer is acting on the rear axle by way of the coupling plate.

It is preferably provided here that the actual axle load value and/or the reference axle load is determined by way of the ride-height control system. Advantageously, no further sensors are thus required for a plausibility check of this type.

It is preferably furthermore provided that the method is carried out fully autonomously or partially autonomously. Accordingly, depending on the application, the coupling procedure can also be carried out without or at least partially without personnel, which reduces the effort.

Furthermore provided according to the disclosure is a coupling control device for carrying out a method according to the disclosure, wherein the coupling control device is configured to actuate a ride-height control system in a truck tractor in such a manner that a height of a chassis of the truck tractor relative to at least one rear axle of the truck tractor changes. Furthermore, the coupling control device is configured to carry out at least the following steps:

- importing a reference height profile, wherein the reference height profile assigns a reference height gradient to different actual height values for the height of the chassis relative to the at least one rear axle;
- actuating the ride-height control system to change the height of the chassis relative to the at least one rear axle in such a manner that the coupling plate of the truck tractor approaches the top plate of the semi-trailer;
- continuously determining actual height values and actual height gradients while changing the height of the chassis relative to the at least one rear axle, wherein an actual height value is assigned the currently determined actual height gradient;
- checking a coupling criterion by comparing a currently determined actual height gradient with a reference height gradient, wherein the reference height gradient is utilized which in the imported reference height profile is assigned to the same actual height value as the currently determined actual height gradient;
- actuating the ride-height control system to maintain the height of the chassis relative to the at least one rear axle when the coupling criterion is met, wherein the coupling criterion is met when the currently determined actual height gradient deviates from the reference height gradient.

The coupling control device is furthermore preferably configured to receive the actual height values from a height sensor of the ride-height control system. No further sensors are therefore necessary, since these are already present in a ride-height control system and are available, for example, by way of the vehicle's data bus, in particular the CAN bus.

Furthermore provided according to the disclosure is a (two-part) vehicle having a truck tractor and a semi-trailer that can be coupled to the truck tractor, the truck tractor having a chassis and a coupling plate arranged thereon and the semi-trailer having a top plate with a kingpin, wherein the kingpin can be pivotably fixed to the coupling plate in the coupled state by a locking device, the truck tractor furthermore having a coupling control device according to the disclosure and a ride-height control system for changing a height of a chassis of the truck tractor relative to at least one rear axle of the truck tractor. The coupling control device here can be integrated in the ride-height control system or communicate with the ride-height control system as an external control device, in particular by way of a data bus in the vehicle, in particular a CAN bus, so that the coupling control device can also be easily retrofitted and/or a simple upgrading capability of the ride-height control system is provided.

BRIEF DESCRIPTION OF DRAWINGS

The invention will now be described with reference to the drawings wherein:

FIG. 1 shows a two-part vehicle including a truck tractor and a semi-trailer;

FIG. 1A shows a detailed view of a coupling plate of the truck tractor according to FIG. 1;

FIGS. 3, 5, 7 show the two-part vehicle according to FIG. 1 during a coupling procedure according to the disclosure; and, FIGS. 4, 6 show diagrams for carrying out a method according to the disclosure.

DETAILED DESCRIPTION

Figure 2:
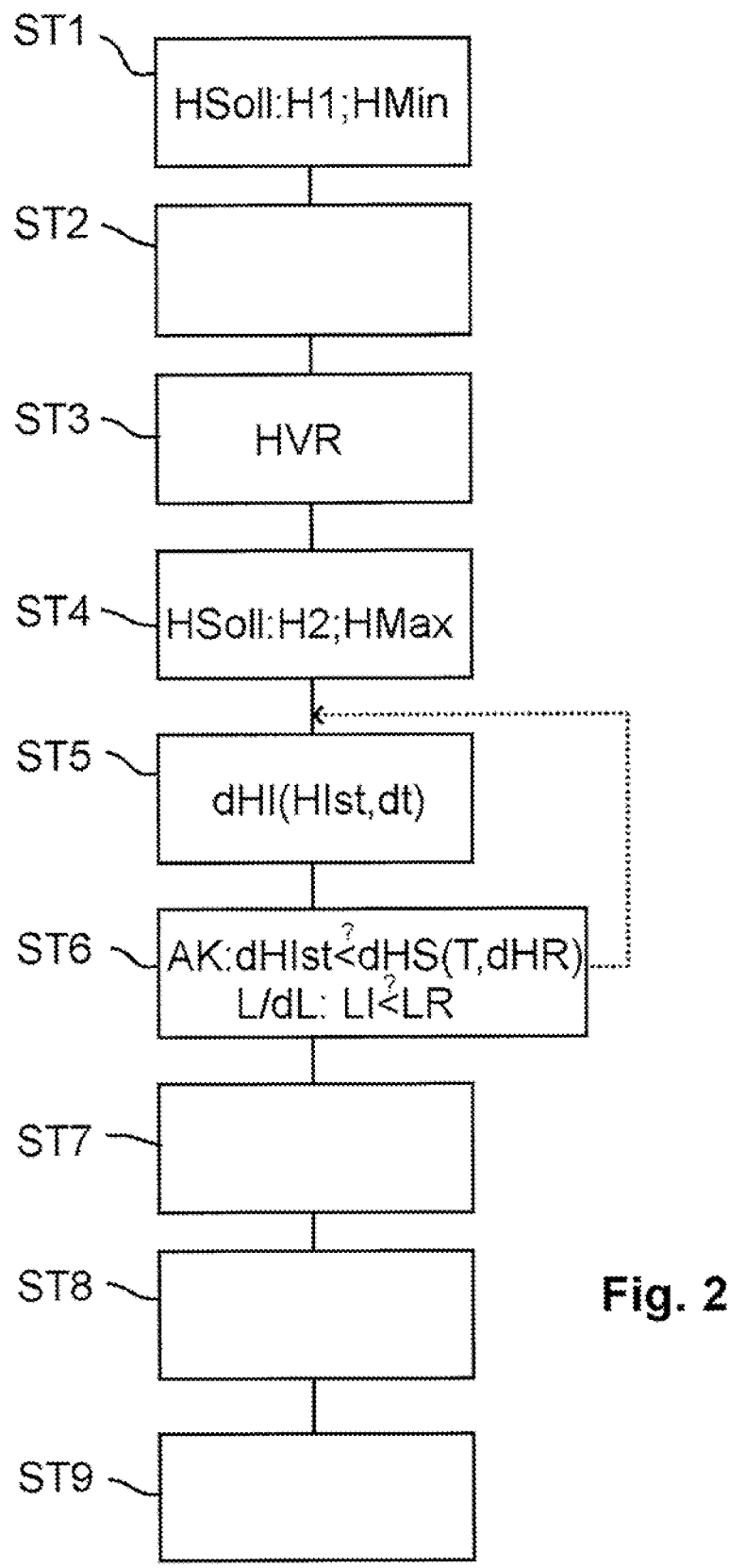
FIG. 2 shows a flow chart of a method according to the disclosure.

FIG. 1 schematically illustrates a two-part vehicle 1, in particular a commercial vehicle, which includes a truck tractor 1a and a parked semi-trailer 1b. The truck tractor 1a has a chassis 2 or vehicle frame on which the driver's cab 3 and a coupling device with a coupling plate 5 (hitch plate) for coupling the semi-trailer 1b to the truck tractor 1a are located. A kingpin 6 is fastened to the semi-trailer 1b below a top plate 7, wherein the kingpin 6 can be received in a receiving slot 8 (see FIG. 1A) in the coupling plate 5 of the truck tractor 1a and locked or fixed therein by way of a locking device 4 so as to pivotally couple the semi-trailer 1b to the truck tractor 1a.

The truck tractor 1a furthermore has a ride-height control system 10, for example, an ECAS ("Electronically Controlled Air Suspension"), by way of which the chassis 2 can be actively raised or lowered relative to one or more rear axles 11 of the truck tractor 1a. Since the coupling device with the coupling plate 5 is firmly connected to the chassis 2, the height of the coupling plate 5 relative to the rear axle(s) 11 and therefore also relative to a hard ground U is also adjusted by way of the ride-height control system 10 at the same time.

The ride-height control system 10 is controlled by a ride-height control device 12. If a level control signal SN is present, the ride-height control device can actively raise or lower the chassis 2 accordingly in relation to the rear axle(s) 11, for example by actively aerating or venting spring bellows (not shown) of the ride-height control system 10. The level control signal SN can contain, for example, a setpoint height value HSoll by way of which a desired height H between the chassis 2 and the rear axle or axles 11 can be specified for the ride-height control device 12.

Furthermore, the ride-height control system 10 has a height sensor 13 which is configured to measure the current height H between the chassis 2 and the rear axle or axles 11. The ride-height control system 10 can output a corresponding actual height value HIst, which characterizes the currently measured height H, by way of a height signal SH. In principle, the height between the coupling plate 5 and the rear axle(s) 11 or the hard ground U can also be derived from this actual height value HIst from simple geometric considerations.

A coupling control device 14 is furthermore provided in the truck tractor 1a, by way of which a coupling procedure AV can be controlled. The coupling control device 14 is configured to import the height signal SH with the actual height value HIst and to output a level control signal SN with a corresponding setpoint height value HSoll to the ride-height control device 12 in order to actively request lowering or raising of the truck tractor 1a.

For this purpose, the coupling control device 14 can be integrated in the ride-height control device 12 or be provided as an external unit, for example, for retrofitting or upgrading an existing ride-height control system 10. As an external unit, the coupling control device 14 can communicate with the ride-height control device 12, for example by way of a data bus 15, for example a CAN bus 15a, in order to exchange the signals SN, SH.

According to FIG. 2, it is provided for example, for a coupling procedure AV, that the following steps are carried out by way of the coupling control device 14:

First, it must be ensured that the height H between the chassis 2 and the rear axle or axles 11 is set in such a manner that the truck tractor 1a can reverse up to the semi-trailer 1b. For this purpose, in a first step ST1, the coupling control device 14 specifies a first height value H1, for example a minimum height HMin, for the ride-height control device 12 by way of the level control signal SN as the desired height value HSoll. This first height value H1 is set in such a manner that the truck tractor 1a can be driven up to the semi-trailer 1b after setting the first height value H1 without the coupling plate 5 and the top plate 7 being able to touch. Preferably, the kingpin 6 should also be higher than the coupling plate 5 in order to avoid contact when approaching. This state is shown in FIG. 1.

In a subsequent second step ST2, the truck tractor 1a is driven up to the parked semi-trailer 1b (manually or autonomously) in such a manner that the coupling plate 5 and the top plate 7 at least partially overlap. At the same time, it is ensured that the kingpin 6 does not overlap with the coupling plate 7, for example by maintaining a longitudinal safety spacing S of approximately 0.7 m, as shown in FIG. 3. In a third step ST3, a previously provided reference height profile HVR is imported or loaded, which is shown by way of example in FIG. 4. In principle, the reference height profile HVR can also be imported before or parallel to steps ST1 and ST2.

The reference height profile HVR assigns a reference height gradient dHR to the height H between the chassis 2 and the rear axle or axles 11. The reference height gradient dHR indicates how quickly or at what actuating speed the height H changes when the chassis 2 is raised or lowered if the chassis 2 is not loaded by an additional load of a semi-trailer 1b (unladen condition). The reference height profile HVR is determined by changing the height H between the first height value H1, for example the minimum height HMin, and a second height value H2, for example a maximum height HMax. At the same time, the reference height gradient dHR is continuously determined from actual height values HIst currently measured by the height sensor 13. The reference height gradient dHR can, for example, be calculated from two actual height values HIst, which were measured with a temporal offset dt of between 100 ms and 300 ms, from which the actuating speed (height gradient) results directly. The reference height gradient dHR determined in this manner is then assigned to the currently present height H, which follows from the currently measured actual height value HIst. The reference height profile HVR is defined by a continuous determination of this type.

Figure 4:
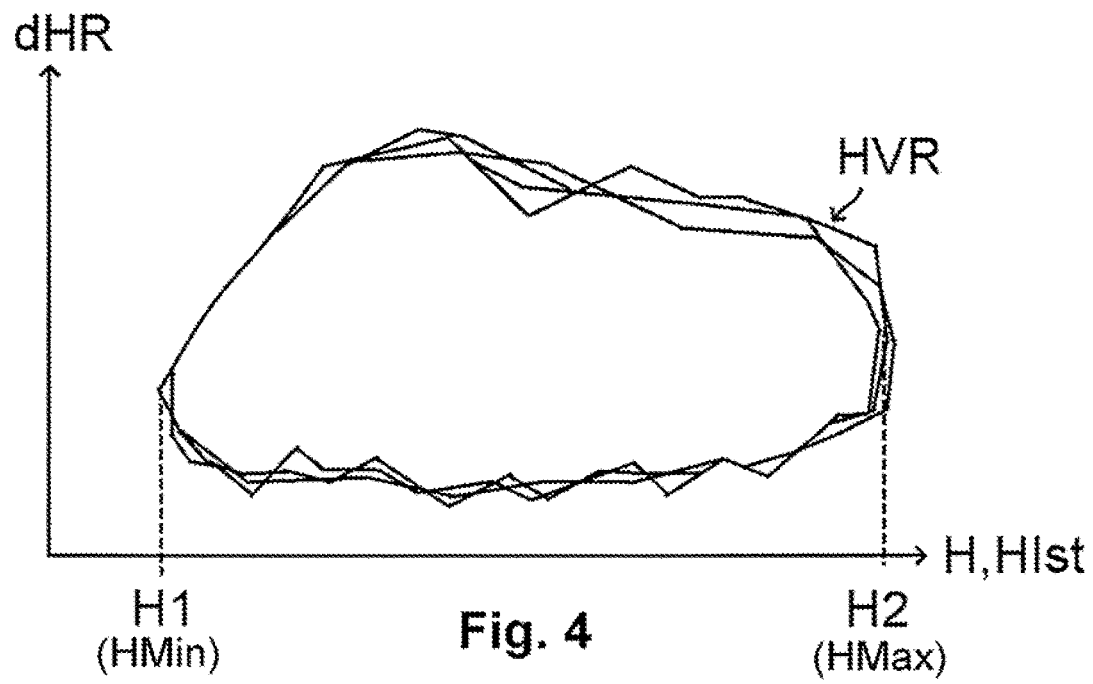

The reference height profile HVR can also follow from several runs, in that the height H between the first height value H1 and the second height value H2 is adjusted multiple times in a ramp-like manner (in both directions) and the corresponding reference height gradient dHR is recorded, as illustrated in FIG. 4. For each height H, for example, a mean value for the respectively associated reference height gradient dHR can then be formed from the multiple runs in order to filter measurement inaccuracies.

The reference height profile HVR is determined in advance, that is, before the first step ST1, for example immediately before the first height value H1 is set and the truck tractor 1a has driven up to the semi-trailer 1b, in order to be able to access a reference height profile HVR that is as up-to-date as possible. However, the reference height profile HVR can also be determined once, for example, at the end of the assembly line or at any regular intervals. It is then stored on the coupling control device 14 so that the individual values for the reference height gradient dHR can be accessed for the coupling procedure AV.

Subsequently, in a fourth step ST4, a second height value H2, for example a maximum height HMax, is specified as the desired height value HSoll to the ride-height control device 12 by way of the level control signal SN to request raising of the chassis 2. As a result, the coupling plate 5 approaches the top plate 7 which has been brought to overlap, as illustrated in FIG. 5.

A currently present actual height gradient dHI is continuously calculated in a fifth step ST5 by evaluating the height signal SH or the actual height values HIst contained therein. Here, too, this is done by measuring two actual height values HIst with a temporal offset dt of between 100 ms and 300 ms and calculating therefrom the current speed of lifting or the current actual height gradient dHI for the height H currently present. A current actual height gradient dHI can thus be assigned to the current actual height value HIst.

In a subsequent sixth step ST6, a coupling criterion AK is checked, which indicates whether the top plate 7 touches the coupling plate 5. This is done by comparing the actual height gradient dHI assigned to the current actual height value HIst with the reference height gradient dHR, which is assigned to the same actual height value HIst. The reference height gradient dHR for the current actual height value HIst results from the reference height profile HVR imported in the third step ST3.

The comparison in the sixth step ST6 can be used to determine whether the same height gradients (cf. dHI) result during the setting of the second height value H2 as in the unloaded state (cf. dHR). It follows directly from this whether the top plate 7 acts on the coupling plate 5 at the current actual height value HIst. The change in height or the determined actual height gradient dHI also indicates directly how quickly the coupling plate 5 is raised, since it is firmly connected to the chassis 2. Contact between the coupling plate 5 and the top plate 7 therefore also has a direct impact on the movement of the chassis 2 and thus on the actual height gradient dHI:

If the top plate 7 does not bear on the coupling plate 5, it is to be expected that the actual height gradient dHI corresponds to the reference height gradient dHR, since no additional load acts on the chassis 2 and the latter is driven upwards unhindered. However, if the actual height gradient dHI assigned to a specific actual height value HIst deviates from the reference height gradient dHR also assigned to this actual height value HIst, then an additional load acts on the chassis 2, primarily by way of the coupling plate 5 due to the weight of the semi-trailer 1b.

Figure 6:
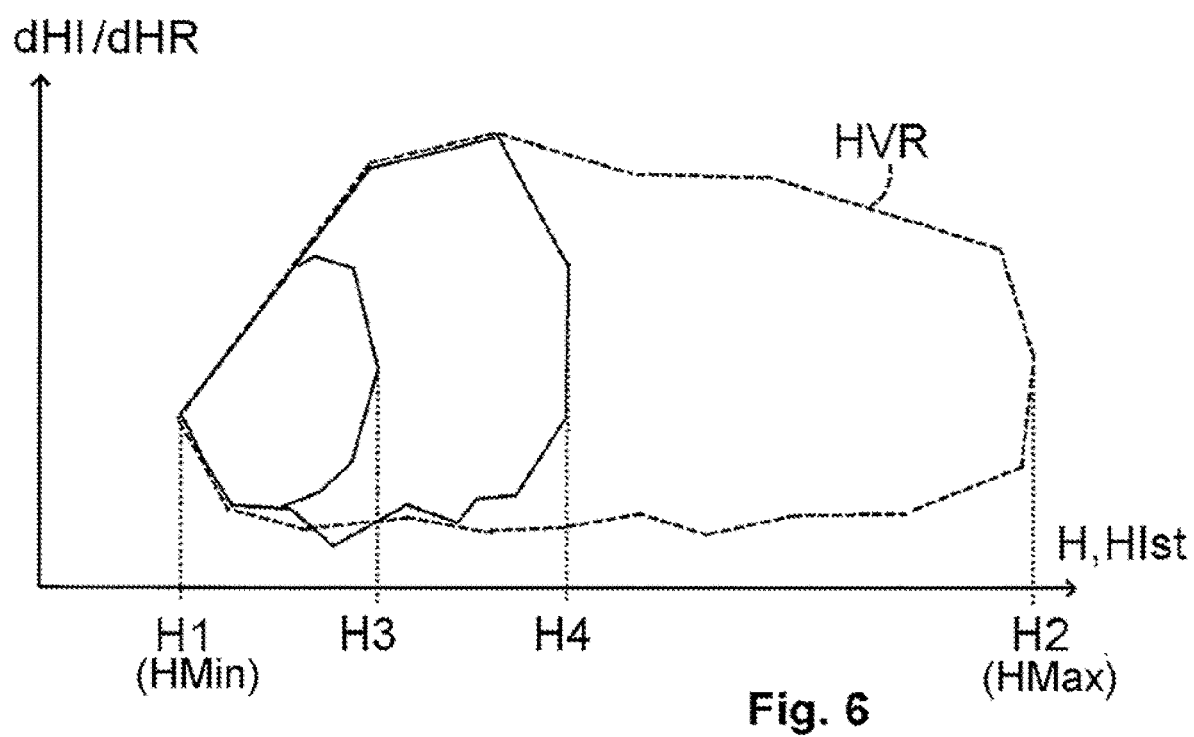

This is illustrated by way of example for two different semi-trailers 1b in FIG. 6, with the reference height profile HVR being drawn in as a dashed line. Accordingly, the profile of the actual height gradient dHI deviates from the actual height values H3 and H4 from the reference height gradient dHR of the reference height profile HVR, with a third actual height value H3 and the fourth actual height value H4 each being assigned to a different semi-trailer 1b. The two actual height values H3, H4 differ because the respective semi-trailers 1b are parked at different heights, that is, the top plate 7 hits the coupling plate 5 sooner or later, respectively, and leads to a buckling of the measured height profile compared to the reference height profile HVR.

The coupling criterion AK is therefore met for the respective semi-trailer 1b if it follows from the comparison that was carried out: dHI (HIst)=/=dHR (HIst). This can also be done taking into account a tolerance factor T to compensate for unwanted deviations due to errors. For example, the coupling criterion AK can thus then be met if the actual height gradient dHI deviates by more than 20% from the reference height gradient dHR. If the actual height gradient dHIst determined for an actual height value HIst falls below a gradient threshold value dHS=T×dHR=0.8×dHR, then the coupling criterion AK is met, since it can be assumed that the semi-trailer 1b, in particular the top plate 7, acts on the truck tractor 1a, in particular the coupling plate 5.

Since the behavior for the unloaded case is used for comparison when checking the coupling criterion AK, contact between the coupling plate 5 and the top plate 7 can be reliably ruled out if there are changes in the actuating speed or the actual height gradient dHIst when the chassis 2 is raised which cannot be attributed to the action of the semi-trailer 1b, but to normal behavior or characteristics of the ride-height control system 10 itself, which also occur in the unloaded case.

In addition, in order to meet the coupling criterion AK, it can be checked how an axle load L acting on the rear axle(s) 11 has changed when the gradient threshold value dHS is undershot. This axle load L can be determined and output by the ride-height control system 10 itself, for example by evaluating the prevailing pneumatic pressures in the air bellows with an ECAS as the ride-height control system 10. For this purpose, at some point before the truck tractor 1a approaches the semi-trailer 1b in step ST4, the actual axle load value LI present at this point in time is stored as the reference axle load LR from an axle load signal SL output by the ride-height control system 10. After it has been determined in the sixth step ST6 that the gradient has fallen below the gradient threshold value dHS, the actual axle load value LI then present is compared with the reference axle load LR.

From an axle load difference dL=LI−LR it can be concluded how much the load or the weight (axle load L) on the rear axle(s) 11 has changed. If the axle load difference dL indicates that the axle load L has changed by more than 1 t during the coupling procedure AV, then it is plausible that the gradient threshold value dHS has not been reached as a result of the top plate 7 being in contact with the coupling plate 5. The coupling criterion AK can therefore be regarded as fulfilled with a high degree of certainty.

If the coupling criterion AK is met, it can be output in a seventh step ST7 by way of the level control signal SN that the current actual height value HIst is used as the setpoint height value HSoll, whereupon the raising of the chassis 2 by way of the ride-height control system 10 is stopped. If the coupling criterion AK is not met, the process continues with steps ST5 and ST6, that is, the chassis 2 is raised further.

If the coupling criterion AK is met and further raising of the chassis 2 is stopped, the truck tractor 1a can be moved closer to the semi-trailer 1b in a subsequent eighth step ST8 (see FIG. 7), wherein, with the level control signal SN, to this end lowering of the truck tractor 1a can additionally be requested in order to facilitate the receiving of the kingpin 6 in the receiving slot 8. In a final ninth step ST9, the locking device 4 can then be actuated in order to fix the kingpin 6 in the receiving slot 8. Furthermore, a landing gear 16 of the semi-trailer 1b on which it was originally parked can be swung up. The coupling procedure AK is thus completed.

It is understood that the foregoing description is that of the preferred embodiments of the invention and that various changes and modifications may be made thereto without departing from the spirit and scope of the invention as defined in the appended claims.

LIST OF REFERENCE SIGNS (PART OF THE DESCRIPTION)

1 Vehicle
1a Truck tractor
1b Semi-trailer
2 Chassis
3 Driver's cabin
4 Locking device
5 Coupling plate
6 Kingpin
7 Top plate
8 Receiving slot
10 Ride-height control system
11 Rear axle of the truck tractor 1a
12 Ride-height control device
13 Height sensor
14 Coupling control device
15 Data bus
15a CAN-Bus
16 Landing gear on semi-trailer 1b
AK Coupling criterion
AV Coupling procedure
dHI Actual height gradient
dHR Reference height gradient
dHS Gradient threshold value
dL Axle load difference
dt Temporal offset
H Height between the chassis 2 and the rear axle 11
H1 First height value
H2 Second height value
H3 Third height value
H4 Fourth height value
HIst Actual height value
HMax Maximum height
HMin Minimum height
HSoll Setpoint height value
HVR Reference height profile
L Axle load
LI Actual axle load value
LR Reference axle load
SH Height signal
SL Axle load signal
SN Level Control Signal
T Tolerance factor
U Hard ground
ST1-ST9 Steps of the method

The invention claimed is:

1. A method for coupling a semi-trailer to a truck tractor, the truck tractor having a chassis and a coupling plate arranged thereon, the semi-trailer having a top plate with a kingpin, wherein the kingpin can be pivotably fixed to the coupling plate in the coupled state by a locking device, wherein the truck tractor furthermore has a ride-height control system, wherein a height of the chassis relative to at least one rear axle of the truck tractor can be changed by actuating the ride-height control system, the method comprising:
    importing a reference height profile, wherein the reference height profile assigns a reference height gradient to different actual height values for the height of the chassis relative to the at least one rear axle;
    changing the height of the chassis relative to the at least one rear axle such that the coupling plate of the truck tractor approaches the top plate of the semi-trailer;
    continuously determining actual height values and actual height gradients while changing the height of the chassis relative to the at least one rear axle, wherein the actual height value is assigned the currently determined actual height gradient;
    checking a coupling criterion by comparing a currently determined actual height gradient with the reference height gradient, wherein the reference height gradient which, in the imported reference height profile, is assigned to the same actual height value as the currently determined actual height gradient, is applied; and,
    maintaining the height of the chassis relative to the at least one rear axle when the coupling criterion is met, wherein the coupling criterion is met when the currently determined actual height gradient deviates from the reference height gradient.

2. The method of claim 1, wherein the reference height profile is determined in advance without the coupling plate of the truck tractor being loaded, wherein to this end the height of the chassis relative to the at least one rear axle is changed once or several times between a first height value and a second height value and during the changing of the height of the chassis relative to the at least one rear axle, the actual height values and the actual height gradients are continuously determined; and,
    the currently determined actual height gradient is assigned to the actual height value as the reference height gradient and is stored in the reference height profile.

3. The method of claim 1, wherein at least one of the actual height gradient and the reference height gradient is achieved by a temporally offset determination of the actual height values, wherein the temporal offset is between 100 milliseconds and 300 milliseconds.

4. The method of claim 1, wherein the height is adjusted by way of the ride-height control system by specifying a desired height value.

5. The method of claim 1, wherein said changing the height of the chassis relative to the at least one rear axle in order to bring the coupling plate of the truck tractor closer to the top plate of the semi-trailer takes place after the top plate of the semi-trailer has been brought at least partially to overlap with the coupling plate of the truck tractor.

6. The method of claim 5, wherein the height of the chassis relative to the at least one rear axle of the truck tractor is adjusted before the coupling plate and the top plate are brought to overlap such that the coupling plate and the top plate do not touch when brought to overlap.

7. The method of claim 5, wherein the coupling plate and the top plate are brought to overlap such that the kingpin does not cover the coupling plate; and, a safety spacing between the coupling plate and the kingpin is maintained.

8. The method of claim 1, wherein the coupling plate touches the top plate when the currently determined actual height gradient deviates from the reference height gradient.

9. The method of claim 1, wherein the coupling criterion is met if the currently determined actual height gradient falls below a gradient threshold value.

10. The method of claim 9, wherein the gradient threshold value is determined from the reference height gradient as a function of a tolerance factor.

11. The method of claim 10, wherein the gradient threshold value equals the tolerance factor multiplied by the reference height gradient.

12. The method of claim 11, wherein the tolerance factor is between 0.7 and 0.85.

13. The method of claim 1, wherein, in order to meet the coupling criterion, it is additionally checked whether an actual axle load value which indicates an axle load on the at least one rear axle in a presence of a deviation between the currently determined actual height gradient and the reference height gradient deviates upward from a reference axle load which is determined prior to changing the height of the chassis relative to the at least one rear axle.

14. The method of claim 13, wherein the coupling criterion is met if an axle load difference between the reference axle load and the actual axle load value, in the presence of a deviation between the currently determined actual height gradient and the reference height gradient, indicates that the axle load on the at least one rear axle has changed by more than 1 ton.

15. The method of claim 13, wherein at least one of the actual axle load value and the reference axle load is determined via the ride-height control system.

16. The method of claim 1, wherein the method is carried out fully autonomously or partially autonomously.

17. A coupling control device, wherein the coupling control device is configured to actuate a ride-height control system in a truck tractor such that a height of a chassis of the truck tractor relative to at least one rear axle of the truck tractor changes, and the coupling device comprises a non-transitory computer readable storage medium having program code stored thereon; said program code being configured, when executed by a processor, to:
 import a reference height profile, wherein the reference height profile assigns a reference height gradient to different actual height values for the height of the chassis relative to the at least one rear axle;
 actuate the ride-height control system to change the height of the chassis relative to the at least one rear axle such that a coupling plate of the truck tractor approaches a top plate of a semi-trailer;
 continuously determine actual height values and actual height gradients while changing the height of the chassis relative to the at least one rear axle, wherein the actual height value is assigned the currently determined actual height gradient;
 check a coupling criterion by comparing a currently determined actual height gradient with the reference height gradient, wherein the reference height gradient which in the imported reference height profile is assigned to the same actual height value as the currently determined actual height gradient is applied; and,
 actuating the ride-height control system to maintain the height of the chassis relative to the at least one rear axle when the coupling criterion is met, wherein the coupling criterion is met when the currently determined actual height gradient deviates from the reference height gradient.

18. The coupling control device of claim 17, wherein said coupling control device is configured to receive the actual height values from a height sensor of the ride-height control system.

19. A vehicle comprising:
 a truck tractor having a chassis and a coupling plate disposed on said chassis;
 a semi-trailer having a top plate with a kingpin and being configured to be coupled to the truck tractor;
 said kingpin being configured to be pivotably fixable to said coupling plate in a coupled state by a locking device;
 said truck tractor further having a ride-height control system for changing a height of said chassis of said truck tractor relative to at least one rear axle of said truck tractor;
 said truck tractor including a processor and a coupling device comprising a non-transitory computer readable storage medium having program code stored thereon;
 said program code being configured, when executed by a processor, to:
 import a reference height profile, wherein the reference height profile assigns a reference height gradient to different actual height values for the height of the chassis relative to the at least one rear axle;
 actuate the ride-height control system to change the height of the chassis relative to the at least one rear axle such that the coupling plate of the truck tractor approaches the top plate of the semi-trailer;
 continuously determine actual height values and actual height gradients while changing the height of the chassis relative to the at least one rear axle, wherein the actual height value is assigned the currently determined actual height gradient;
 check a coupling criterion by comparing a currently determined actual height gradient with the reference height gradient, wherein the reference height gradient which, in the imported reference height profile, is assigned to the same actual height value as the currently determined actual height gradient, is applied; and,
 actuating the ride-height control system to maintain the height of the chassis relative to the at least one rear axle when the coupling criterion is met, wherein the coupling criterion is met when the currently determined actual height gradient deviates from the reference height gradient.

20. The vehicle of claim 18, wherein said coupling control device is connected to a ride-height control device of said ride-height control system in a signal-conducting manner or said coupling control device is integrated in said ride-height control device of said ride-height control system.

\* \* \* \* \*